(No Model.)

G. F. SIMONDS.
Saw Swage.

No. 239,198.          Patented March 22, 1881.

Witnesses:
F. Walter Fowler,
Jno. L. Condron

Inventor;
George F. Simonds
per attys
A. H. Evans & Co

UNITED STATES PATENT OFFICE.

GEORGE F. SIMONDS, OF FITCHBURG, MASSACHUSETTS.

SAW-SWAGE.

SPECIFICATION forming part of Letters Patent No. 239,198, dated March 22, 1881.

Application filed January 19, 1881. (No model.)

*To all whom it may concern:*

Be it known that I, GEORGE F. SIMONDS, of Fitchburg, Massachusetts, have invented a new and useful Improvement in Swages for Saw-Teeth, of which the following is a clear, full, and exact description, reference being had to the accompanying drawings, making a part of this specification, in which—

Figure 1:
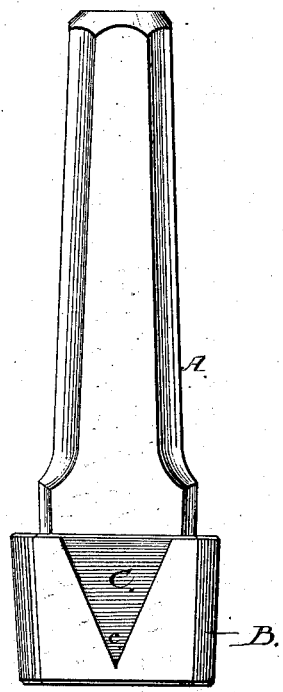
Figure 3:
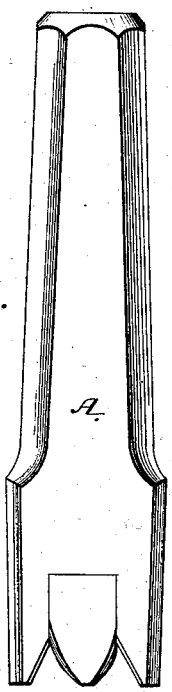
Figure 2:
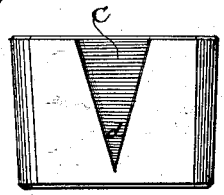
Figure 4:
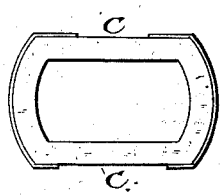

Figure 1 represents a side elevation of a swage with my improvements attached. Fig. 2 shows the opposite side of the collar of the swage. Fig. 3 shows the swage with the collar removed. Fig. 4 shows the plan view of the collar.

My invention refers to a gage to determine the angle of a saw-tooth upon which the swage is capable of acting; and it consists in two angular recesses of different but determined sizes, one cut on each side of the collar of the swage, so as to be always present with the swage.

To enable others skilled in the art to make and use my invention, I will proceed to describe the exact manner in which I have carried it out.

In the drawings, A represents a saw-tooth swage provided with the collar B, in the usual manner. On one side of the collar I cut the angular recess C, having an angle at *c* of about forty-five degrees, and on the opposite side of the collar I cut a similar recess, D, having an angle at *d* of about thirty-three degrees. These recesses may be cut into the collar about one-third of the thickness of the metal. By actual experiments I have ascertained that saw-teeth should never be less in their angles than thirty-three degrees or greater than forty-five degrees; and my improvement gives this range for the variation of the angles of the teeth to be swaged—that is, a saw designed for summer sawing should not have teeth of an angle less than my minimum gage, nor for winter sawing an angle greater than my maximum gage. Teeth of any angle between these degrees can always be properly swaged with the swaging-tool, on which the guides are formed, and which furnish a ready means of determining whether or not the swage is suited to the teeth to be operated upon.

I do not claim, broadly, measuring angles for saw-teeth; but,

Having thus explained my invention, what I claim as new, and desire to secure by Letters Patent, is—

Jointly, a swage and collar, B, the latter provided on one side with a recess having an angle of about forty-five degrees, and on the opposite side with a similar recess having an angle of about thirty-three degrees, substantially as and for the purpose set forth.

GEO. F. SIMONDS.

Witnesses:
R. K. EVANS,
JNO. L. CONDRON.